United States Patent [19]

Miyatsuka et al.

[11] Patent Number: 4,687,705
[45] Date of Patent: Aug. 18, 1987

[54] MAGNETIC RECORDING MEDIUM

[75] Inventors: Hajime Miyatsuka; Akira Kasuga; Akihiro Matsufuji; Takeshi Kakuta, all of Kanagawa, Japan

[73] Assignee: Fuji Photo Film Co., Ltd., Kanagawa, Japan

[21] Appl. No.: 731,806

[22] Filed: May 8, 1985

[30] Foreign Application Priority Data

May 8, 1984 [JP] Japan ................................. 59-90128
Jun. 11, 1984 [JP] Japan ............................... 59-118093

[51] Int. Cl.$^4$ ............................................. G11B 5/702
[52] U.S. Cl. ................................. 428/329; 252/62.54; 427/128; 428/405; 428/407; 428/694; 428/900
[58] Field of Search ............... 428/694, 695, 329, 405, 428/407, 900; 427/131, 128; 252/62.54; 360/134–136

[56] References Cited

U.S. PATENT DOCUMENTS

| 3,139,354 | 6/1964 | Wolff | 252/62.54 |
|---|---|---|---|
| 3,790,407 | 2/1974 | Merten | 428/694 |
| 4,074,012 | 2/1978 | Heikkinen | 428/694 |
| 4,076,890 | 2/1978 | Yamada | 428/694 |
| 4,330,600 | 5/1982 | Kawasumi | 428/694 |
| 4,361,621 | 11/1982 | Isobe | 428/329 |
| 4,379,809 | 4/1983 | Matsufuji | 428/694 |
| 4,407,901 | 10/1983 | Miyatsuka | 428/695 |
| 4,439,486 | 3/1984 | Yamada | 428/694 |
| 4,455,345 | 6/1984 | Miyatuka | 428/694 |
| 4,501,795 | 2/1985 | Takeuchi | 428/694 |
| 4,529,649 | 7/1985 | Takeuchi | 428/329 |
| 4,533,565 | 8/1985 | Okita | 427/44 |
| 4,537,833 | 8/1985 | Kasuga | 428/480 |
| 4,555,431 | 11/1985 | Miyatsuka | 428/329 |

Primary Examiner—Ellis P. Robinson
Attorney, Agent, or Firm—Sughrue, Mion, Zinn, Macpeak, and Seas

[57] ABSTRACT

A magnetic recording medium is disclosed which comprises a non-magnetic support having provided thereon a magnetic layer containing ferromagnetic metal particles and a binder, wherein the ferromagnetic metal particles have a specific surface area of 30 m$^2$/g or more, and a saturation magnetization of 120 emu/g or more and have been surface-treated with an organic compound. Also, a magnetic recording medium is disclosed which comprises a non-magnetic support having provided thereon a magnetic layer containing ferromagnetic particles and a binder, wherein the ferromagnetic particles have been surface-treated with an organic compound and the binder has essentially no functional groups which adsorb onto ferromagnetic metal particles.

11 Claims, No Drawings

MAGNETIC RECORDING MEDIUM

FIELD OF THE INVENTION

The present invention relates to a magnetic recording medium, and more particularly it relates to an improved magnetic recording medium using ferromagnetic metal particles.

BACKGROUND OF THE INVENTION

Commonly used iron oxide type fine particles and ferromagnetic metal particles which are used for improving a magnetic recording density and a reproduced output because of their high saturation magnetization and high coercive force have been investigated as ferromagnetic particles.

The dispersibility of ferromagnetic particles has continuously been improved in order to improve the characteristics of a magnetic recording medium, particularly the electromagnetic properties such as the sensitivities of S/N ratio. However, ferromagnetic metal particles have problems in that the particles readily aggregate because of their high magnetization. Thus, a coating composition having the particles well dispersed therein cannot be obtained. As a result, a smooth magnetic layer having a good surface property cannot be obtained.

Additionally, ferromagnetic metal particlas are easily oxidized and are unstable in air. A magnetic tape (a metal tape) prepared using ferromagnetic metal particles thus has a tendency that the magnetization is reduced (demagnetization) particulary when the tape is exposed to high humidity.

It is necessary that the particle size of the ferromagnetic metal particles is minimized and that the saturation magnetization ($\sigma$s) is increased in order to improve the sensitivity and S/N of a magnetic recording medium (or a magnetic metal tape) using ferromagnetic metal particles.

However, as the particle size is minimized and as saturation magnetization is increased, the dispersibility and stability of the magnetic characteristics deteriorates.

Various methods for providing ferromagnetic particles with a surface treatment have been proposed in order to improve the dispersibility of the ferromagnetic particles and to improve the demagnetization of the ferromagnetic metal particles are described, for example, in U.S. Pat. Nos. 3,700,499, 3,284,358, 4,420,330 and 4,369,076.

One of the methods which is commonly employed is forming an oxide layer on the surface of the ferromagnetic metal particles. However, this does not provide satisfactory results. Further, a chemical treatment and a method for chemically connecting organic compounds such as a complex and a coupling agent on the surface of the ferromagnetic metal particles have also been proposed.

Of the proposals, the method for chemically connecting organic compounds on the surface of the particles is the most efficient because the caking phenomenon hardly occurs among the particles at the time of treatment and the treating agent does not separate from the surface of particles. Further, the dispersibility of particles is greatly improved at the time of mixing a binder in the coating composition. However, the surface property of a magnetic layer which is coated and dried is not greatly improved and on the contrary, it often happens that the surface property thereof is worse than that of a magnetic layer comprising particles which have not been subjected to surface treatment.

The above problem is more serious as the amount of an organic compound which connects on the surface of particles increases.

A certain amount of an organic compound is necessary in order to prevent ferromagnetic metal particles from demagnetization. But this method is not satisfactory because of the above described problem.

SUMMARY OF THE INVENTION

A first object of the present invention is to provide a magnetic recording medium having excellent electromagnetic properties.

A second object of the present invention is to provide a magnetic recording medium using ferromagnetic metal particles which are stable and have low demagnetization.

A third object of the present invention is to provide a method for preparing a magnetic recording medium which comprises easily dispersing ferromagnetic metal particles with a binder.

DETAILED DESCRIPTION OF THE INVENTION

The present invention relates to (1) a magnetic recording medium comprising a non-magnetic support having provided thereon a magnetic layer consisting mainly of ferromagnetic metal particles and a binder, wherein the ferromagnetic metal particles have specific surface area of 30 m$^2$/g or more and a saturation magnetization of 120 emu/g or more, and wherein the particles have been subjected to surface treatment with an organic compound, and it relates to (2) a magnetic recording medium comprising a non-magnetic support having provided thereon a magnetic layer consisting mainly of ferromagnetic particles and a binder, wherein the ferromagnetic particles have been subjected to surface treatment with an organic compound, and wherein the binder has substantially no functional groups which adsorb the ferromagnetic particles.

The surface treatment in the present invention comprises a method for treating with a fatty acid, a metal salt of a fatty acid, a complex, a coupling agent, an isocyanic acid compound, an isocyanate, an oligomer having various functional groups and an organic compound having a reactive group or functional group which easily coats the surface of the ferromagnetic metal particles and a method for coating a polymer layer on the surface of the ferromagnetic metal particles by reacting a polymerizable monomer thereon. The amount of an organic compound used for coating is 0.2 wt% or more, preferably 0.5 wt% or more, and 20 wt% or less, preferably 10 wt% or less.

In short, the surface treatment referred to in the present invention means that various organic compounds which will be illustrated hereinafter are made to coat the surface of the ferromagnetic metal particles by a chemical reaction or similar reaction force. Therefore, even though the ferromagnetic metal particles which have been subjected to a surface treatment are washed by an organic solvent having strong dissolving power such as methyl ethyl ketone or tetrahydrofuran, the organic compound coated on the surface of particles are hardly removed therefrom. If any, only 20% or less of the organic compound coated on the surface are removed therefrom.

Many methods of surface treatment have been proposed and known.

Surface tretment using a coupling agent is disclosed in Japanese Patent Application (OPI) Nos. 111829/1982, 60535/1982, 104594/1976, 109498/1976, 125539/1980 and 111829/1982 (the term "OPI" as used herein means a "published unexamined Japanese Patent Application"). Surface treatment using a chrome complex is disclosed in Japanese Patent Application (OPI) No. 72498/1977. Surface treatment using metal alkolate and metal alkoxide is disclosed in Japanese Patent Application (OPI) Nos. 13548/1982, 120704/1983, 63601/1982 and 50599/1977, and U.S. Pat. No. 4,330,600.

Surface treatment using an isocyanate compound is disclosed in Japanese Patent Publication Nos. 4122/1975 and 115506/1975, and U.S. Pat. No. 3,964,939.

Surface treatment using a fatty acid and a metal salt of a fatty acid is disclosed in Japanese Patent Application Nos. 143521/1981, 4199/1974, 116114/1978, Japanese Patent Publication Nos. 20116/1968, Japanese Patent Application (OPI) Nos. 97738/1974, 13906/1978 and 8798/1978.

Surface treatment of coating the surface of particles with a polymer is disclosed in Japanese Patent Application (OPI) Nos. 102606/1976, 134752/1979, 134753/1979, 15280/1980 and 15281/1980, and U.S. Pat. No. 4,073,977.

Surface treatment using the other organic compounds is disclosed in Japanese Patent Publication Nos. 19056/1982, 342/1982, 4470/1969, Japanese Patent Application (OPI) Nos. 62904/1981, 62905/1981, 62906/1981, 119696/1979, 152067/1983, 142949/1983, 155703/1983, 186907/1983 and 205929/1983.

A binder used together with the ferromagnetic metal particles in the present invention is a conventionally known thermoplastic resin, a thermosetting resin or a mixture thereof. Specific examples include a cellulose type resin, a copolymer of polyvinyl chloride type, a polyurethane type resin, which can be hardened by an isocyanate compound, a butadiene type resin, a copolymer of acryle type and an epoxy type resin. these binders can be used alone or in combination and additives can be added thereto. The binder can be used in an amount of 10 to 50, preferably 15 to 35, and more preferably 20 to 30, parts by weight based on 100 parts by weight of the ferromagnetic metal particles.

The binder used in the present invention is preferably a non-polar polymer or an oligomer which does not have any functional group which easily adsorbs onto the surface of the ferromagnetic metal particles, or which has a functional group in such a slight amount that the functional group does not essentially adsorb onto the surface of the particles. The amount of the functional group is preferably 0.03 wt% or less based on the total amount of the binder. Specific examples of the functional group is a hydroxy group, a carboxyl group, a sulfonic acid group, a phosphoric group, etc.

The binder which does not adsorb on the surface of the ferromagnetic particles is a thermosetting resin, a thermoplastic resin, a reactive type resin or a mixture thereof which is generally used for a magnetic recording medium. Specific examples include a copolymer of vinyl chloride and vinyl acetate, an acrylic type resin, an epoxy type resin, a polyamide resin, a butadiene type resin, a urethane elastomer and a curable isocyanate resin. The degree of polymrization is preferably 100 to 10,000.

The above described binders can be used alone or in combination.

When a binder having a functional group is used in combination, the total amount of the functional group is preferably 0.03 wt% or less based on the total amount of the binder.

Ferromagnetic particles used in the present invention include $\gamma$-$Fe_2O_3$, $Fe_3O_4$, $CrO_2$, Co-FeOx (x=1.33 to 1.50), and Ba-ferrite particles as described, e.g., in U.S. Pat. Nos. 4,305,921, 4,251,504 and 3,046,158.

In the present invention, ferromagnetic metal particles are the most preferred. The methods for preparing ferromagnetic metal particles are illustrated as follows.

(1) A method which comprises heat-decomposing an organic acid salt of the ferromagnetic metal particles and reducing it with a reducing gas as described, e.g., in U.S. Pat. Nos. 3,186,829 and 3,190,748.

(2) A method of reducing acicular oxyhydroxides, metal containing oxyhydroxides or acicular iron oxide obtained from the oxyhydroxides (method of reducing iron oxide) as described, e.g., in U.S. Pat. Nos. 3,598,568, 3,634,036, 3,607,219 and 3,607,220.

(3) A method of evaporating ferromagnetic metal in an inactive gas under a low pressure (low vacuum evaporation method) as described, e.g., in U.S. Pat. No. 4,197,347.

(4) A method of heat-decomposing a metal carbonyl compound as described, e.g., in U.S. Pat. Nos. 2,983,997 and 3,172,776.

(5) A method which comprises electrodepositing ferromagnetic metal particles using a mercury cathode and separating them from mercury as described, e.g., in U.S. Pat. Nos. 3,198,777 and 3,156,650.

(6) A method of reducing metal salts which form ferromagnetic particles in an aqueous solution with a reducing substance such as a boron hydride compound, a hypophosphite or a hydrazine as descrobed, e.g., in U.S. Pat. Nos. 3,607,218, 3,756,866 and 3,206,338.

In the present invention, ferromagnetic metal particles prepared in accordance with the above-described methods (2), (3) and (6) are easy to use and particularly particles prepared in accordance with method (2) are the most preferred in view of low cost and high quality. Upon preparing ferromagnetic metal particles of the present invention, it is preferred that an oxide layer is coated on the surface of particles according to the methods described in Japanese Patent Application (OPI) Nos. 67798/77, 140221/78 and 16601/81 to improve the chemical stability of the metal particles.

Ferromagnetic metal particles are composed of pure iron or an alloy such as Fe, Fe—Ni, Fe—Ni—Co and can further contain non-magnetic or non-metallic elements such as B, C, N, Al, Si, P, S, Ti, Cr, Mn, Cu or Zn in a slight amount, e.g., 0.01 to 10 wt%, preferably 0.05 to 5 wt% based on the total composition. In order to realize the present invention the most effectively, specific surface area of ferromagnetic metal particles is 30 $m^2/g$ or more and preferably 40 $m^2/g$ or more.

Necessary saturation magnetization of ferromagnetic metal particles in 120 emu/g or more, preferably 125 emu/g or more. the residual magnetization (Br) or a magnetic layer can be increased using magnetic particles having high saturation magnetization, whereby a magnetic recording medium having high video sensitivity can be obtained.

The above described ferromagnetic metal particles are mixed and kneaded with a binder to prepare a magnetic coating composition.

The binder is used in an amount of 8 to 25 parts by weight, preferably 15 to 25 parts by weight based on 100 parts by weight of the ferromagnetic metal particles.

The method of preparing a magnetic recording medium by mixing and kneading ferromagnetic metal particles which are subjected to surface treatment as described above, and by coating the thus prepared magnetic coating composition on the non-magnetic support is a generally known method.

A magnetic coating composition mainly contains ferromagnetic metal particles, a binder and a solvent for coating and further can contain a dispersing agent, a lubricating agent, an abrasive agent and an antistatic agent as additives.

The dispersing agents (wetting agents for pigment) are a fatty acid having 12 to 18 carbon atoms ($R_1COOH$, where $R_1$ is an alkyl or an alkenyl group having 11 to 17 carbon atoms) such as caprylic acid, capric acid, lauric acid, myristic acid, palmitic acid, stearic acid, oleic acid, elaidic acid, linolic acid, linolenic acid or stearol acid; metal soap consisting of alkali metal (e.g., Li, Na, K and the like) or alkaline earth metal (Mg, Ca, Ba) of the fatty acid; a fluorine-containing ester of the fatty acid; an amide of the fatty acid; polyalkylene oxide alkyl phosphate; lecithin; trialkyl polyolefin oxyquaternary ammonium salt (alkyl group having 1 to 5 carbon atoms, olefin such as ethylene, propylene and the like). In addition to the above, higher alcohols having 12 or more of carbon atoms and sulfates can be also used. These dispersing agents can be used in an amount of 0.5 to 20 parts, preferably 0.5 to 2 parts, by weight based on 100 parts by weight of the binders.

The antistatic agents used in the present invention are electroconductive fine particles such as carbon black or carbon black graft polymer; natural surface active agents such as saponin; nonionic surface active agents such as alkylene oxide type agent, a glycerine type agent or glycidol type agent; cationic surface active agents such as higher alkyl amines, quaternary ammonium salts, pyridine and other heterocyclic compounds, phosphonium or sulfonium; anionic surface active agents such as carboxylic acid, a sulfonic acid, a phosphoric acid or a compound having an acid group of sulfate or phosphate; and amphoteric surface active agents such as amino acid, amino sulphonic acids or a sulfate or a phosphate of aminoalcohol.

The above electroconductive fine particles are used in an amount of 0.2 to 20 parts, preferably 0.2 to 10 parts, by weight based on 100 parts by weight of the binder. The above surface active agents are used in an amount of 0 to 10 parts, preferably 0 to 5 parts, by weight based on 100 parts of the binder.

Various fatty acids and fatty acid esters are added in order to improve the running property and to reduce the friction coefficient of a magnetic layer to guide parts, a head cylinder and cassette parts of VTR, an audio deck and the like. A solid lubricating agent of inorganic particles such as silicone oil (e.g., polysiloxane), graphite, molybdenum disulfide, plastic fine particles such as polyethylene or polytetrafluoro ethylene and fluorocarbons; an abrasive agent such as alumina, silicon carbide, chrome oxide ($Cr_2O_3$), corundum or diamond; ketones such as methyl ethyl ketone or cyclohexanone, alcohols, esters such as ethyl acetate or butyl acetate, aromatic solvents such as benzene, toluene or xylene and chlorinated hydrocarbon type solvents such as carbon tetrachloride or chloroform can be further added, if desired.

Non-magnetic supports include a synthetic resin such as polyester, vinyl type polymer or cellulose type derivative, non-magnetic metal and a paper, which are used in a form of a film, a tape or a sheet.

It is effective that a backing layer is provided on the back surface of the support opposite to the magnetic layer for the purpose of improving the running properties and durability. When ferromagnetic metal particles are used as magnetic particles, the thickness of the magnetic recording medium tends to be reduced. Therefore, provision of the backing layer is particularly effective when ferromagnetic metal particles are used. The backing layer has a thickness of 0.1 to 2.0 $\mu$m, preferably 0.3 to 1.0 $\mu$m, and comprises a binder and fine particles. Fine particles mainly contain inorganic particles such as carbon black, graphite, calcium carbonate, alumina, titanium oxide, SiC, $SiO_2$, chromium oxide, boron nitride, MgO or CoO. Among these, carbon black is the most preferred because it works as an antistatic agent for running tapes. Chromium oxide, calcium carbonate, $SiO_2$ and titanium oxide can be mixed together with carbon black. The fine particles are used in an amount of 0.5 to 1.5 times as much as the binder.

The magnetic layer provided on the support is subjected to magnetic orientation to improve magnetic properties such as S/N and the like before it is dried and it is subjected to smoothing treatment such as calendering after it is dried as described in U.S. Pat. Nos. 2,688,567 and 2,998,325.

It is effective that the magnetic layer is abraded with a grinding stone or is subjected to sliding treatment using a blade to eliminate sticked substance or a bump which is present on the surface of the magnetic recording medium and is the cause of drop-out or noise. The above surface treatment is very effective for the magnetic recording medium using ferromagnetic metal particles used for high density recording, because slight defects on the surface properties are very serious for that medium.

The above described additives, supports and the method for preparing the magnetic recording medium are disclosed in U.S. Pat. No. 4,135,016.

The feature of the present invention is that a non-polar binder is used ass a binder. When ferromagnetic metal particles which are subjected to surface treatment using an organic compound are used, the conventionally used binder used for a magnetic recording medium deteriorates the dispersibility of the treated particles more than that of the untreated particles, whereby a smooth magnetic layer cannot be obtained.

In the present invention it has been found that the relationship between the ferromagnetic metal particles treated with an organic compound and the binder depends upon the amount of the polar functional group of the binder in a molecule and that as the amount of the functional group decreases and reaches, in some cases, zero, better results can be obtained. It is not clear why the large amount of the functional group in the binder is not preferable, but it is considered that as the site where the functional group of a binder is to adsorb is occupied by an organic compound, the excessive large amount of the functional group of the binder interacts with each other, whereby a stable coating composition and a homogeneously smooth magnetic layer cannot be obtained.

In accordance with the present invention, ferromagnetic particles can easily be dispersed, the period of time for dispersion can be shortened and the dispersing device can have a reduced task. Even under the same dispersing condition as that of a conventional prior art, a coating composition having better dispersibility can be obtained.

Magnetic particles hardly agglomerate with the passage of time after being dispersed, and therefore, the pot life of the coating composition can be improved.

It is considered that the above advantages are obtained because an organic compound which is coated on the surface of the ferromagnetic particles prevents the magnetic particles from their interaction and agglomeration.

The effects are particularly increased when ferromagnetic metal particles having high saturation magnetization ($\sigma s$) and having large specific surface area are used. It is expected that as the saturation magnetization increases, the specific surface area becomes larger, the particle size becomes smaller, the sensitivity increases more and S/N increases higher. But in the prior art, that expectation is not realized. That is, in actuality, as the saturation magnetization and specific surface area become higher, the particles disperse with more difficulty. Even if the particles are once dispersed, they easily agglomerate. Therefore a smooth surface of a magnetic layer can hardly be obtained. Thus, the output cannot be improved as expected, noise is high and high S/N cannot be obtained.

The difference between the prior art and the present invention becomes remarkable when the saturation magnetization is 120 emu/g or more and specific surface area is 30 m²/g or more, and in the present invention a magnetic recording medium having excellent electromagnetic properties can be obtained.

In accordance with the present invention, as particles can easily be dispersed, the dispersion step is very simple, since the period of time of dispersion can be shortened and the number of dispersing devices to be used can be reduced.

And also in accordance with the present invention, the viscosity of the coating composition can be decreased, thereby reducing the amount of solvent to be employed. Therefore, the drying step becomes very simple. In short, in the present invention, manufacturing the cost can be reduced, because the steps are simple.

In the present invention, as the magnetic orientation of the particles is good, the squareness ratio is high and the electromagnetic properties can be improved.

Stability, which is an important factor for the ferromagnetic metal particles, can be improved in the present invention. Particles which are allowed to stand in air proceed to be oxidized with difficulty because an organic compound is coated on the surface of the particles. Additionally, even after the particles are mixed and kneaded with a binder, deterioration of the magnetic characteristics (demagnetization) caused by oxygen and moisture in air hardly occurs.

The present invention will be illustrated in more detail by the following non-limiting examples and comparative examples. In examples and comparative examples, all parts are by weight.

Samples prepared in the following examples and comparative examples were measured in the following manner:

Magnetic characteristics of particles and magnetic tapes were measured by a vibration sample magnetometer, "VSM-III type", a trademark, manufactured by Toei Kogyo Co.) in 10 kOe magnetic field (Hm);

The video characteristic is shown by a reproduced output of each magnetic tape at 4 MHz which is measured by means of a VHS type VTR (trademark: "NV-8800" manufactured by Matsushita Electric Co., Ltd.) of which the recording and reproducing head is replaced by a sendust alloy head. A standard magnetic tape is a VHS type magnetic tape "T-120 E", manufactured by Fuji Photo Film Co., Ltd.;

The S/N ratio is a ratio of output to noise level measured at 3.0 MHz of reproduced amplified modulated signals after recording carrier signals at 4 MHz;

Demagnetization was calculated in the following formula by measuring the residual magnetic flux density Br at 2 kOe magnetic field (Hm) by means of the above described vibration sample magnetometer "VSN-III type";

$$(1 - Br'/Br) \times 100$$

Br' is the residual magnetic flux density of a magnetic tape which was allowed to stand at 60° C. and 90% RH for 7 days.

EXAMPLES 1 AND 2 AND COMPARATIVE EXAMPLES 1 TO 4

Fe—Ni alloy particles "A to D" (Ni content: about 5%) having the following saturation magnetization ($\sigma s$) and specific surface area which is measured by BET method using $N_2$ gas ("Quantasorb", Quantachrome Co., Ltd.) as shown in Table 1 were dipped in a toluene solution of 25 wt% lauryl acetoaluminum diisopropionate, stirred, allowed to stand for 10 hours, filtered and dried to obtain surface treated particles having about 0.5 wt% of the aluminum compound coated on the surface of the particles per magnetic particle based on the weight of the ferromagnetic particles. The surface treated particles were washed with toluene and the amount of aluminum compound dissolved into the toluene was 5% or less per total amount of the aluminum compound coated on the magnetic particles.

TABLE 1

| Ferromagnetic Metal Particles (Fe—Ni) | Saturation Magnetization (emu/g) | Specific Surface Area S (m²/g) |
|---|---|---|
| A | 110 | 45 |
| B | 115 | 43 |
| C | 123 | 45 |
| D | 130 | 46 |

For comparison, Fe—Ni alloy particles were treated in the same manner as above except that the toluene solution did not contain the aluminum compound.

| | |
|---|---|
| Ferromagnetic Metal Particles (Fe—Ni alloy) | 300 parts |
| Copolymer of Vinyl Chloride and Vinyl Acetate (87/13 by weight) ("VYHH", trademark, manufactured by Union Carbide Co.) | 30 parts |
| Polyester Polyurethane (butylene adipate/neopenyl glycol/diphenylmethane diisocyanate = 2/1/3 by mole; molecular weight: 48,000; OH groups are attached on both | 20 parts |

-continued

| | |
|---|---|
| terminals of the molecule) | |
| α-alumina | 15 parts |
| (average particle size: 0.6 μm) | |
| Butyl Acetate | 500 parts |
| Methyl Isobutyl Ketone | 300 parts |

The above composition was mixed, kneaded and dispersed in a ball mill for about 10 hours, then a 75 wt% ethyl acetate solution of 25 parts of oleic acid, 5 parts of stearic acid, 6 parts of butyl stearate and 25 parts of triisocyanate compound ("Desmodur L-75", manufactured by Bayer Co., Ltd.) was added thereto and stirred with high speed for 1 hour to prepare a homogeneous magnetic coating composition.

The coating composition was coated on a polyethylene terephthalate film (thickness: 12.5 μm), which was subjected to magnetic orientation, dried and subjected to calendering treatment and slit to a desired width to prepare a magnetic tape.

The characteristics of the tape thus obtained are shown in Table 2.

properties, the noise is high and S/N ratio is low, since dispersibility of the magnetic particles was poor.

Untreated particles exhibited high demagnetization.

EXAMPLES 3 TO 5 AND COMPARATIVE EXAMPLES 5 TO 8

The same procedure as in Example 1 were repeated except using Fe—Ni ferromagnetic alloy particles E, F, C and G as shown in Table 3 to prepare a magnetic tape. The characteristics of the tape were measured in the same manner as above. The results are shown in Table 4.

TABLE 3

| Ferromagnetic Metal Particles (Fe—Ni) | Saturation Magnetization (emu/g) | Specific Surface Area S (m²/g) |
|---|---|---|
| E | 125 | 25 |
| F | 127 | 32 |
| C | 123 | 45 |
| G | 125 | 56 |

TABLE 4

| | Ferromagnetic Metal Particles | Magnetic Properties | | | Video Output at 4 MHz (dB) | S/N Ratio (dB) | Degree of Demagnetization (%) |
|---|---|---|---|---|---|---|---|
| | | Coercive Force Hc (Oe) | Maximum Saturation Magnetic Flux Density Bm (G) | Squareness Ratio | | | |
| Comparative Example 5 | E(0) | 1460 | 2880 | 0.80 | +8.0 | +6.5 | 4.3 |
| Example 3 | F(0) | 1480 | 2900 | 0.80 | +9.5 | +8.0 | 6.7 |
| Example 4 | C(0) | 1470 | 2930 | 0.78 | +10.0 | +9.0 | 7.3 |
| Example 5 | G(0) | 1480 | 2850 | 0.78 | +10.0 | +9.0 | 6.6 |
| Comparative Example 6 | E(x) | 1500 | 3050 | 0.75 | +8.5 | +6.5 | 8.8 |
| Comparative Example 7 | F(x) | 1510 | 3000 | 0.75 | +9.0 | +7.0 | 16.2 |
| Comparative Example 8 | G(x) | 1500 | 2960 | 0.73 | +8.5 | +7.5 | 17.0 |

(0): Surface treated particles
(x): Untreated particles

TABLE 2

| | Ferromagnetic Metal Particles | Magnetic Properties | | | Video Output at 4 MHz (dB) | S/N Ratio (dB) | Degree of Demagnetization (%) |
|---|---|---|---|---|---|---|---|
| | | Coercive Force Hc (Oe) | Maximum Saturation Magnetic Flux Density Bm (G) | Squareness Ratio | | | |
| Comparative Example 1 | A(0) | 1510 | 2750 | 0.80 | +7.5 | +6.5 | 6.8 |
| Comparative Example 2 | B(0) | 1500 | 2800 | 0.78 | +8.0 | +6.5 | 8.4 |
| Example 1 | C(0) | 1480 | 2980 | 0.77 | +9.0 | +7.8 | 7.5 |
| Example 2 | D(0) | 1500 | 2850 | 0.77 | +10.0 | +8.5 | 7.1 |
| Comparative Example 3 | C(x) | 1500 | 3010 | 0.74 | +8.0 | +6.0 | 13.3 |
| Comparative Example 4 | D(x) | 1510 | 2900 | 0.73 | +8.0 | +6.0 | 18.5 |

(0): Surface treated particles
(x): Untreated particles

It is apparent from Table 2 that magnetic particles which have high saturation magnetization (C and D) and are subjected to surface treatment (Examples 1 and 2) exhibited high squareness ratio and excellent electromagnetic properties. Magnetic particles which had high saturation and were not subjected to surface treatment (Comparative Examples 3 and 4) exhibited a low squareness ratio, and regarding the electromagnetic properties, the noise is high and S/N ratio is low, since Even though the magnetic particles were subjected to surface treatment, excellent electromagnetic properties could not be obtained when the specific surface area of the particles was not high.

Magnetic particles having high specific surface area could further improve the electromagnetic properties, when they were subjected to surface treatment. As the specific surface area increased, the effect of the surface treatment increased more. Similarly, the demagnetization was improved when the particles were subjected to surface treatment and its effect increased more as the specific surface area increased.

EXAMPLES 6 TO 8 AND COMPARATIVE EXAMPLES 9 AND 10

Fe—Ni alloy particles (Ni content: 5%) having 50 m$^2$/g of specific surface area measure by the BET method were dipped in a toluene solution of 1 to 3 wt% lauryl acetoaluminum diisopropionate, allowed to stand for 10 hours, filtered and dried to obtain surface treated particles having 0.12 wt%, 0.24 wt%, 0.56 wt% and 1.2 wt% of the aluminum compound coated on the surface of the particles per magnetic particle based on the weight of the ferromagnetic particles. When the surface treated particles were washed with toluene, the amount of the aluminum compound dissolved into toluene was 5% or less per the aluminum compound coated on the magnetic particles.

For comparison, magnetic particles treated only with toluene and having no organic compound on the surface of the particles (0 wt%) were prepared.

| | |
|---|---|
| Above-described Alloy Particles | 300 parts |
| Copolymer of Vinyl Chloride and Vinyl Acetate (87/13 by weight) ("VYHH" trademark, manufactured by Union Carbide Co.) | 30 parts |
| Polyester Polyurethane (butylene adipate/neopenyl glycol/diphenylmethane diisocyanate = 2/1/3 by mole; molecular weight of 48,000; OH group are attached on both terminals of the molecule | 20 parts |
| Butyl Acetate | 500 parts |
| Methyl Isobutyl Ketone | 300 parts |
| α-alumina (average particle size: 0.6 μm) | 15 parts |

The above composition was mixed, kneaded and dispersed sufficiently in a ball mill for about 13 hours, then a 75 wt% ethyl acetate solution of 2.5 parts of oleic acid, 5 parts of stearic acid, 6 parts of butyl stearate and 25 parts of triisocyanate compound ("Desmodur L-75", trademark, manufactured by Bayer A.G.) was added thereto and stirred homogeneously by a high speed shearing device for about 1 hour to prepare a magnetic coating composition. The thus obtained coating composition was coated on a polyethylene terephthalate film having a permeability of 15 μVz, which was subjected to magnetic orientation, dried and subjected to calendering treatment and slit to a predetermined width to prepare a magnetic tape.

COMPARATIVE EXAMPLE 11

The same procedure as in Example 7 were repeated except a copolymer of vinyl chloride, vinyl acetate and maleic anhydride (86/13/1; molecular weight: 25,000) was used instead of a copolymer of vinyl chloride and vinyl acetate ("VYHH", trademark, manufactured by Union Carbide Co.) as a binder.

The resulting magnetic layer was not homogeneous and the squareness ratio and electromagnetic properties were not so improved.

COMPARATIVE EXAMPLE 12

The same procedures as in Comparative Example 11 were repeated except using alloy particles which had not been surface-treated with the same organic compound as that used in Comparative Example 10. A magnetic layer having much smoother surface than that prepared in Comparative Example 11 was obtained. The electromagnetic properties are relatively high, but the demagnetization was very high.

EXAMPLE 9

The same alloy particles as used in Example 6 were treated with dimethyl diethoxy silane in the same manner as in Example 6 to prepare surface-treated particles having 0.60 wt% of the organic compound coated on the surface of the particles, based on the weight of the ferromagnetic particles. A magnetic tape was prepared in the same manner as in Example 6.

The characteristics of four kinds of magnetic tapes are shown in Table 5.

TABLE 5

| | Amount of Treating Compound (wt %) | Magnetic Properties | | | Video Output at 4 MHz (dB) | S/N Ratio (dB) | Degree of Demagnetization (%) |
|---|---|---|---|---|---|---|---|
| | | Coercive Force Hc (Oe) | Maximum Saturation Magnetic Flux Density Bm (G) | Squareness Ratio | | | |
| Example 6 | 1.2 | 1510 | 2970 | 0.82 | +10.4 | +8.7 | 4 |
| Example 7 | 0.56 | 1500 | 2850 | 0.80 | +10.3 | +9.5 | 6 |
| Example 8 | 0.24 | 1510 | 2910 | 0.78 | +8.0 | +7.2 | 8 |
| Comparative Example 9 | 0.12 | 1500 | 2800 | 0.73 | +4.0 | +2.5 | 13 |
| Comparative Example 10 | 0 | 1500 | 2900 | 0.72 | +3.3 | +0.8 | 15 |
| Comparative Example 11 | 0.56 | 1510 | 2820 | 0.73 | +5.5 | +4.3 | 5 |
| Comparative Example 12 | 0 | 1500 | 2950 | 0.74 | +7.8 | +6.8 | 22 |
| Example 9 | 0.60 | 1500 | 2850 | 0.78 | +9.0 | +7.8 | 4 |

(0): Surface treated particles
(x): Untreated particles

As the results in Table 5 demonstrate, the squareness ratio as well as the electromagnetic properties such as output, S/N ratio or demagnetization can be improved by surface treating the magnetic particles.

The coating composition was allowed to stand for about 15 hours and then a magnetic layer was coated in the same manner as in Example 6. A magnetic tape having a coarse surface was obtained in the comparative examples. On the other hand, a magnetic having a homogenously smooth surface was obtained in the examples. More specifically, in Examples 6 to 9, the magnetic tape using the coating composition which was allowed to stand for 15 hours exhibited nearly the same characteristics as that of the coating composition which was not allowed to stand for 15 hours.

EXAMPLE 10

γ-Iron oxide having a specific surface area of 30 m$^2$/g was used instead of the ferromagnetic alloy particles used in Example 7. A homogeneously dispersed coating composition was obtained after dispersing for 13 hours in a ball mill. A magnetic layer having a smooth surface was obtained. Both the magnetic properties and electromagnetic properties were excellent.

EXAMPLE 11 TO 17

A copolymer of vinyl chloride, vinyl acetate and maleic acid was synthesized under the conditions that the mixing weight ratio of vinyl chloride and vinyl acetate was determined as 85:15 and that the weight ratio of maleic acid was that as shown in Table 6.

The same procedures as in Example 6 were repeated except for using the magnetic particles as used in Example 7 and the above resin as a binder in the ratio of 100 g to 25 g, to prepare a magnetic tape.

With each example, numbers of polar groups (calculated values) and gloss measured by a mirror gloss meter (angle of incidence and angle of reflection, 45°) are shown in Table 6.

TABLE 6

| Example | Weight Ratio of Maleic Acid to be Used (wt %) | Number of COOH per 100 g of Resin | Number of Polar Group per g of Magnetic Particles | Gloss on the Surface of Coated Layer (%) |
|---|---|---|---|---|
| 11 | 5.00 | 5.26 × 10$^{22}$ | 1.31 × 10$^{20}$ | 58 |
| 12 | 1.25 | 1.32 × 10$^{22}$ | 3.3 × 10$^{19}$ | 60 |
| 13 | 0.875 | 9.2 × 10$^{21}$ | 2.3 × 10$^{19}$ | 63 |
| 14 | 0.625 | 6.6 × 10$^{21}$ | 1.65 × 10$^{19}$ | 77 |
| 15 | 0.50 | 5.3 × 10$^{21}$ | 1.33 × 10$^{19}$ | 86 |
| 16 | 0.375 | 3.9 × 10$^{21}$ | 9.75 × 10$^{18}$ | 94 |
| 17 | 0.125 | 1.3 × 10$^{21}$ | 3.25 × 10$^{18}$ | 95 |

It is clear from the results of gloss in Table 6 that resins having a functional group of 1.65 × 10$^{19}$ or more per g of magnetic particles exhibited poor gloss and resins having a functional group of less than 1.65 × 10$^{19}$ per g of magnetic particles exhibited high gloss.

EXAMPLES 18 TO 27

The same procedures as in Example 7 were repeated except mixing 25 parts of polyester polyurethane as used in Example 6 with a copolymer of vinyl chloride, vinyl acetate and maleic acid (85:15:5) as used in Exlample 12 in an amount as shown in Table 7 and dispersing 100 parts of magnetic particles as used in Example 7 to prepare a magnetic tape.

For each Example, the number of polar groups and gloss measured by a mirro gloss meter (angle of incidence and reflection: 45°) are shown in Table 7.

TABLE 7

| Example | Polyester Polyurethane | Resin (parts) | Number of Polar Group per g of Magnetic Particles | Gloss on the Surface of Coated Layer (%) |
|---|---|---|---|---|
| 18 | 25 | 0 | 6.25 × 10$^{18}$ | 108 |
| 19 | 24 | 1 | 1.12 × 10$^{19}$ | 100 |
| 20 | 23 | 2 | 1.62 × 10$^{19}$ | 98 |
| 21 | 22 | 3 | 2.12 × 10$^{19}$ | 69 |
| 22 | 21 | 4 | 2.62 × 10$^{19}$ | 63 |
| 23 | 20 | 5 | 3.12 × 10$^{19}$ | 62 |

TABLE 7-continued

| Example | Polyester Polyurethane | Resin (parts) | Number of Polar Group per g of Magnetic Particles | Gloss on the Surface of Coated Layer (%) |
|---|---|---|---|---|
| 24 | 15 | 10 | 5.62 × 10$^{19}$ | 61 |
| 25 | 10 | 15 | 8.11 × 10$^{19}$ | 61 |
| 26 | 5 | 20 | 1.06 × 10$^{20}$ | 60 |
| 27 | 0 | 25 | 1.31 × 10$^{20}$ | 58 |

It is apparent from Table 7 that samples having polar groups of 2.12 × 10$^{19}$ or more per g of magnetic particles exhibited poor gloss.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer containing ferromagnetic metal particles and a binder which has essentially no functional groups which adsorb onto the ferromagnetic metal particles, wherein the ferromagnetic metal particles have a specific area of 30 m$^2$/g or more, a saturation magnetization of 120 emu/g or more and have been surface-treated with an organic compound in an amount of from 0.2 to 20 weight percent based on the weight of the ferromagnetic particles, the amount of the essentially no functional groups in the binder being 0.03 weight percent or less based on the total amount of the binder, said ferromagnetic particles having been surface-treated prior to being added to the binder.

2. The magnetic recording medium as claimed in claim 1, wherein said organic compound is employed in an amount of from 0.5 to 10 weight percent, based on the weight of the ferromagnetic particles.

3. The magnetic recording medium as claimed in claim 1, wherein said binder is selected from the groupb consisting of a thermoplastic resin, a thermosetting resin or a mixture thereof.

4. The magnetic recording medium as claimed in claim 1, wherein said binder is employed in an amount of from 10 to 50 parts by weight based on 100 parts by weight of the ferromagnetic metal particles.

5. The magnetic recording medium as claimed in claim 1, wherein said ferromagnetic metal particles have a specific surface area of 40 m$^2$/g more at a saturation magnetization of 125 emu/g or more.

6. The magnetic recording medium as claimed in claim 1, wherein the binder is non-polar.

7. The magnetic recording medium as claimed in claim 1, wherein the functional groups are selected from the group consisting of a hydroxy group, a carboxyl group, a sulfonic acid group and a phosphoric group.

8. The magnetic recording medium as claimed in claim 1, wherein said ferromagnetic metal particles, after having been surface-treated, if washed with an organic solvent selected from methylethylketone and tetrahydrofuran lose the the organic compound from the surface thereof in an amount of only 20% or less.

9. The magnetic recording medium as claimed in claim 1, wherein said surface-treating is by contacting the ferromagnetic metal particles with the organic compound in an organic solvent, permitting the same to stand, and thereafter drying the thus treated ferromagnetic metal particles.

10. The magnetic recording medium as claimed in claim 9, wherein the organic compound is lauryl acetoaluminum diisopropionate.

11. The magnetic recording medium as claimed in claim 9, wherein the organic compound is dimethyl diethoxysilane.

* * * * *